United States Patent
Banerjee et al.

(10) Patent No.: US 11,132,106 B2
(45) Date of Patent: Sep. 28, 2021

(54) USER-SPECIFIC APPLICATIONS FOR SHARED DEVICES

(71) Applicant: VMWARE, INC., Palo Alto, CA (US)

(72) Inventors: Swarnadeep Banerjee, Bangalore (IN); Ashish Maan, Bangalore (IN); Arvind Maan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 418 days.

(21) Appl. No.: 15/966,000

(22) Filed: Apr. 30, 2018

(65) Prior Publication Data
US 2019/0286290 A1    Sep. 19, 2019

(30) Foreign Application Priority Data
Mar. 13, 2018   (IN) .............................. 201841009202

(51) Int. Cl.
*G06F 3/0484* (2013.01)
*G06F 3/0482* (2013.01)
*G06F 9/451* (2018.01)
*G06F 21/31* (2013.01)
*G06F 21/62* (2013.01)

(52) U.S. Cl.
CPC .......... *G06F 3/0484* (2013.01); *G06F 3/0482* (2013.01); *G06F 9/451* (2018.02); *G06F 21/31* (2013.01); *G06F 21/629* (2013.01)

(58) Field of Classification Search
CPC ......... H04L 67/18; H04L 51/04; H04L 67/02; B62D 1/184; G06Q 20/29; G06F 21/6218; G06F 40/106
See application file for complete search history.

(56) References Cited

U.S. PATENT DOCUMENTS

| | | | | |
|---|---|---|---|---|
| 9,632,851 | B1 * | 4/2017 | Johansson | G06F 21/6218 |
| 2007/0208992 | A1 * | 9/2007 | Koren | H04L 67/02 |
| | | | | 715/212 |
| 2014/0331811 | A1 * | 11/2014 | Fujiwara | B62D 1/184 |
| | | | | 74/493 |
| 2015/0195235 | A1 * | 7/2015 | Trussel | H04L 51/04 |
| | | | | 455/413 |
| 2016/0042166 | A1 * | 2/2016 | Kang | G06F 3/04886 |
| | | | | 726/7 |
| 2016/0070812 | A1 * | 3/2016 | Murphy | G06F 40/106 |
| | | | | 707/608 |
| 2017/0041741 | A1 * | 2/2017 | Stevens | H04L 67/18 |
| 2017/0352019 | A1 * | 12/2017 | Li | G06Q 20/29 |
| 2019/0236263 | A1 * | 8/2019 | Fu | H04L 63/0815 |

* cited by examiner

*Primary Examiner* — Toan H Vu
(74) *Attorney, Agent, or Firm* — Clayton, McKay & Bailey, PC

(57) ABSTRACT

Examples described herein include systems and methods for providing user-specific applications on a shared user device. The user device can receive a first instance of an application having a Package ID that includes an identification of a first user. When the first user is logged in, the user device can display an icon associated with the first instance of the application, based on the Package ID including an identification of the first user. When the first user is not logged in, the user device can hide the first instance of the application. When a second user is logged in, the device can display a second instance of the application based on the Package ID of the second instance including an identification of the second user. The user device can also display the same instance of a shared application to both the first and second user.

20 Claims, 7 Drawing Sheets

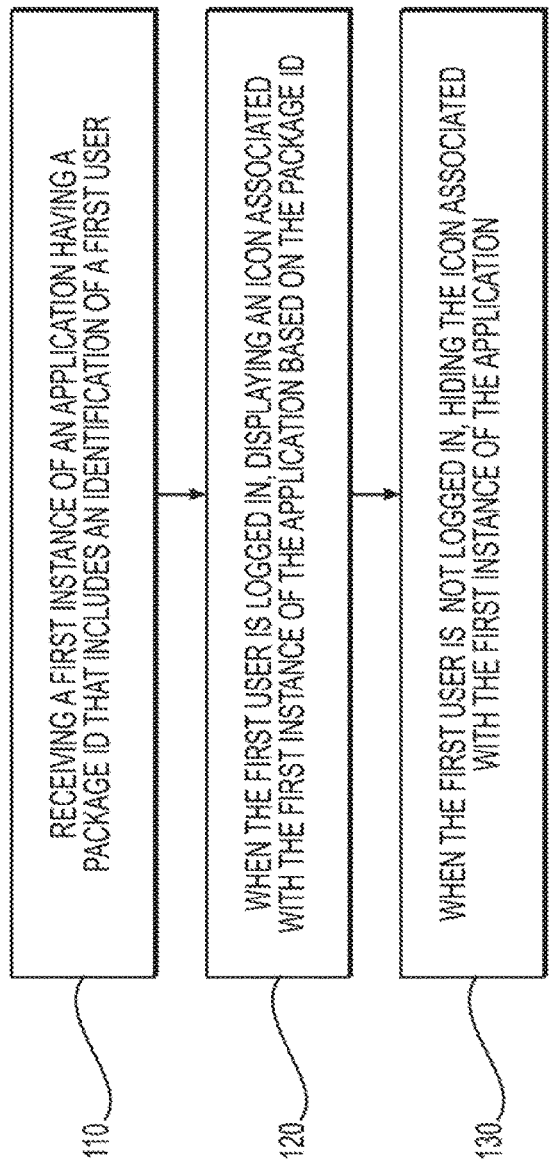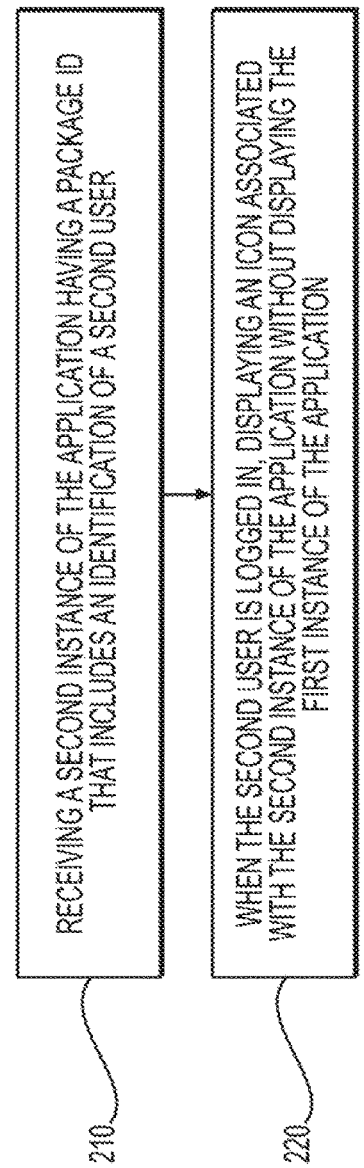

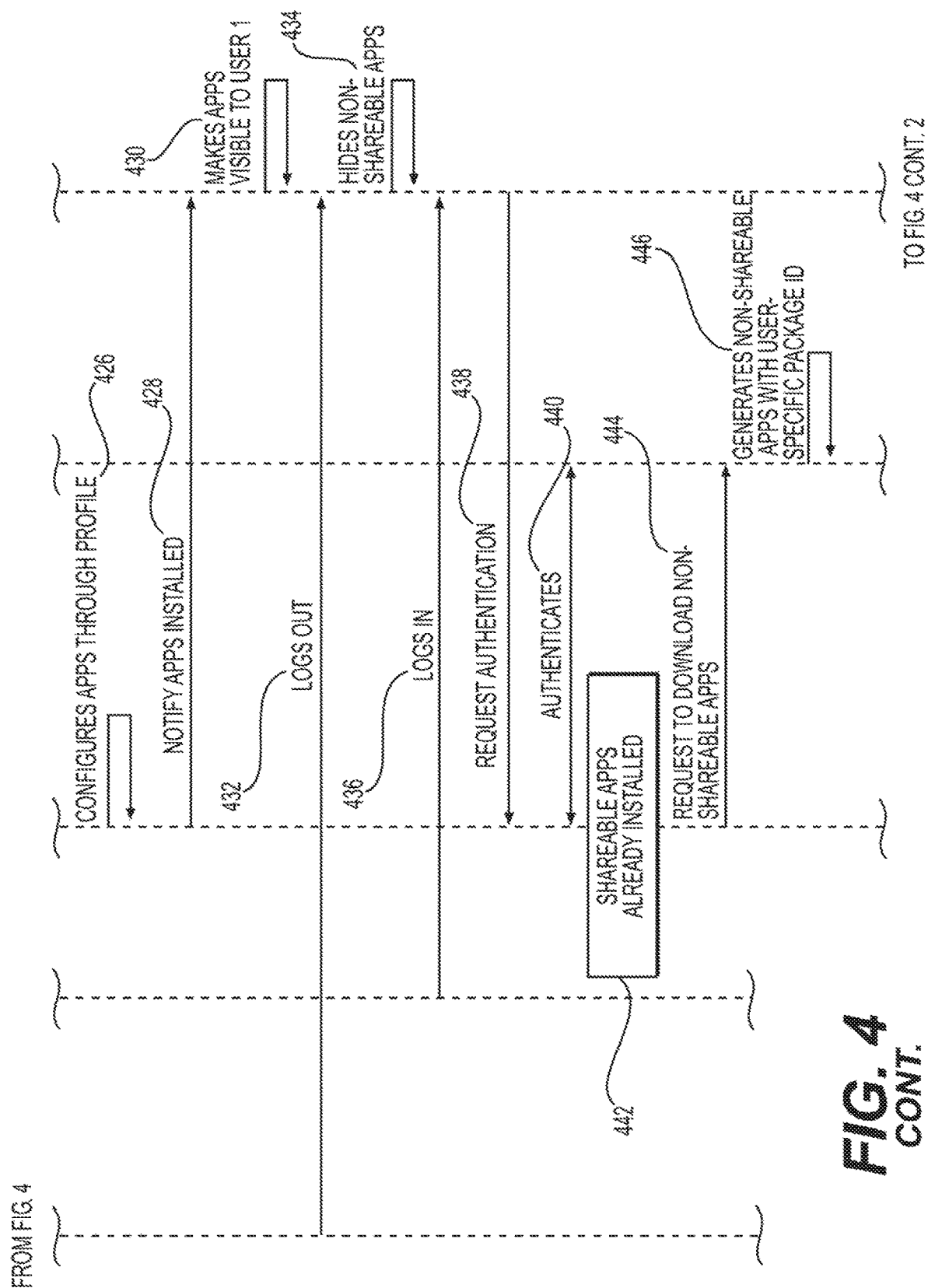

USER-SPECIFIC APPLICATIONS FOR SHARED DEVICES

RELATED APPLICATIONS

Benefit is claimed under 35 U.S.C. 119(a)-(d) to Foreign Application Serial No. 201841009202 filed in India entitled "USER-SPECIFIC APPLICATIONS FOR SHARED DEVICES", on Mar. 13, 2018, by VMware, Inc., which is herein incorporated in its entirety by reference for all purposes.

BACKGROUND

Some current Mobile Device Management ("MDM") and Enterprise Mobility Management ("EMM") systems (collectively, "EMM systems") support device sharing across multiple users. An enterprise can provide an enterprise device, such as a tablet, that can be shared by multiple users. This can potentially create security concerns for applications that require separate instances for each user to maintain security. For example, if an email application is configured to access a first user's secure email account, and that instance of the email application was shared with a second user, the second user could potentially access the first user's email account. As a result, a new instance of that application is required. Meanwhile, other applications, such a purely web-based application, might not create security concerns due to sharing a device across users.

Current EMM systems attempt to solve these problems by using separate user spaces for all applications assigned to each user, requiring an inefficient resource footprint by saving multiple versions of the same applications on the device. The EMM system can also wipe all applications on a shared device when a user logs out of the device. When a user logs back in, the EMM system can provision applications available to that user. The process repeats as users log in and out of the device. One reason systems operate this way is that the operating system can prevent installation of two concurrent copies of the same application.

While this process allows multiple users to securely share a device, it is not particularly efficient or pleasant to use. Each time a user logs in to a shared device, all applications need to be fetched from a server or other remote location, leading to excessive data consumption and delaying productive use of the device. After the applications are loaded on device, the user must reconfigure those applications as if downloaded for the first time. For example, the user's credentials and application settings will not be saved from a previous use. This is true for secure applications that require separate instances for each user, but also for other applications that could potentially be shared across users without presenting any security risks. Users lose efficiency and can become frustrated with this process.

As a result, a need exists for systems and methods that allow users to share a device in a manner that allows secure access to applications without requiring re-provisioning of the applications each time a user logs in.

SUMMARY

Examples described herein include systems and methods for providing user-specific applications on a user device. An example method includes authenticating a first user to log in at the user device. While described as logging in at or to the device, this step can include logging in to an application or interface on the device or logging on to the device itself, such as at a lock screen. This can include receiving credentials from the user and authenticating them, either on the device or by using a remote authentication service. The method can also include receiving, at the user device, a first instance of an application. As used herein, an "instance" of an application can include a particular software package of an application, a particular installation of an application, or a particular virtualization of an application.

The first instance of the application can have an identifier, such as a Package ID, that includes an identification of the first user. As used herein, a "Package ID" can include any identification information describing an application or an instance of an application. In one example, the Package ID of an application can be generated or modified to include an identification of the first user, such as by including a username or User ID in the Package ID of the application.

The example method can include displaying an icon associated with the first instance of the application at the user device, based on the Package ID. For example, the device can select an application to display based on the Package ID including a user identification that matches a user identification of the user logged in to the device. When the first user is not logged in to the user device, the method can include hiding the first instance of the application. For example, the user device can present a user interface that does not include an icon associated with the first instance of the application.

The example method described above can be extended to work with multiple users. For example, the method can include receiving a second instance of an application that has a Package ID including an identification of a second user. When the second user is logged in, the device can display an icon associated with the second instance of the application, based on the Package ID. When the second user is logged in, the device can hide or otherwise choose not to display the first instance of the application or an icon associated with the first instance of the application. Additionally, each user can utilize a different encryption key such that the hidden applications are encrypted in a manner that makes them inaccessible to the active user.

In addition to handling user-specific applications for multiple users on the same device, the example method can also efficiently display shared applications across users. For example, the example method can include, when the first user is logged in to the user device, displaying a shared instance of a shared application. The method can also include, when the second user is logged in to the user device, displaying the same shared instance of the shared application. An administrator can use a console associated with a management server to select whether a particular application can be shared by multiple users or whether separate instances of that application should be generated for each user. The administrator can assign application settings based on organizational groups, in an example.

Although an instance of an application can be hidden, or otherwise not displayed, when the appropriate user is not logged in to the device, the device can retain all data associated with the application. For example, the device can store the instance of the application—as well as any data associated with that instance of the application, such as configuration information—on the device. The stored information can be restored when the appropriate user logs in at the device. The stored information, including the stored instance of the application, can be deleted if that instance of the application is not accessed within a threshold time period.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 1 is a flowchart of an exemplary method for providing user-specific applications on a shared user device.

FIG. 2 is a flowchart of an exemplary method for providing user-specific applications on a shared user device.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for providing user-specific applications on a shared user device. The user device can receive a first instance of an application having a Package ID that includes an identification of a first user. When the first user is logged in, the user device can display an icon associated with the first instance of the application, based on the Package ID including an identification of the first user. When the first user is not logged in, the user device can hide the first instance of the application. The user device can also receive a second instance of the application having a Package ID that includes an identification of a second user. When the second user is logged in, the device can display the second instance of the application based on the Package ID of the second instance including an identification of the second user.

When a user is not logged in, the hidden instance of the application and its associated data are stored, rather than deleted. When the user logs back in, the relevant instance is provided without the need for provisioning or setup. Meanwhile, the user device can display the same instance of a shared application to both the first and second user when they are logged in. An administrator can determine which applications are "shareable," such that multiple users sharing a device can utilize the same instance of the shared application. The non-shareable, user-specific applications can be displayed only when the relevant user is logged in.

Figure 3:
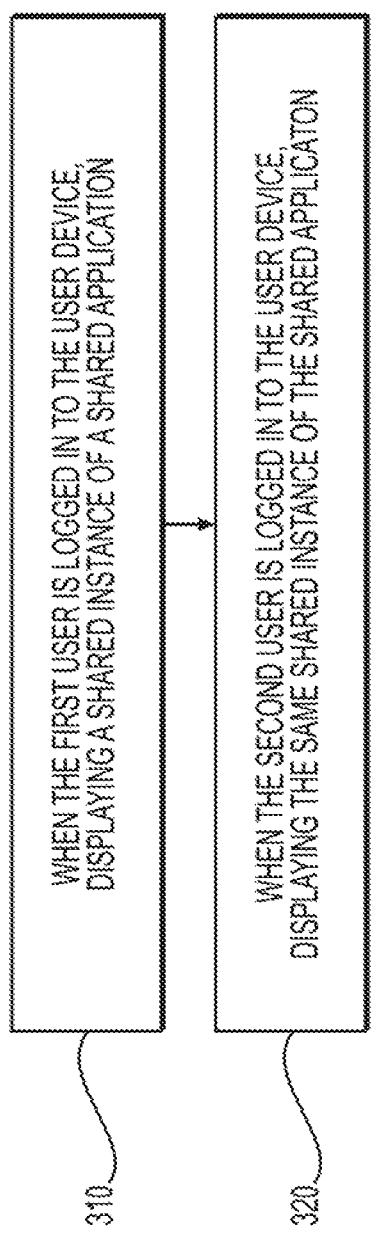
FIG. 3 is a flowchart of an exemplary method for providing user-specific applications on a shared user device.
Figure 4:
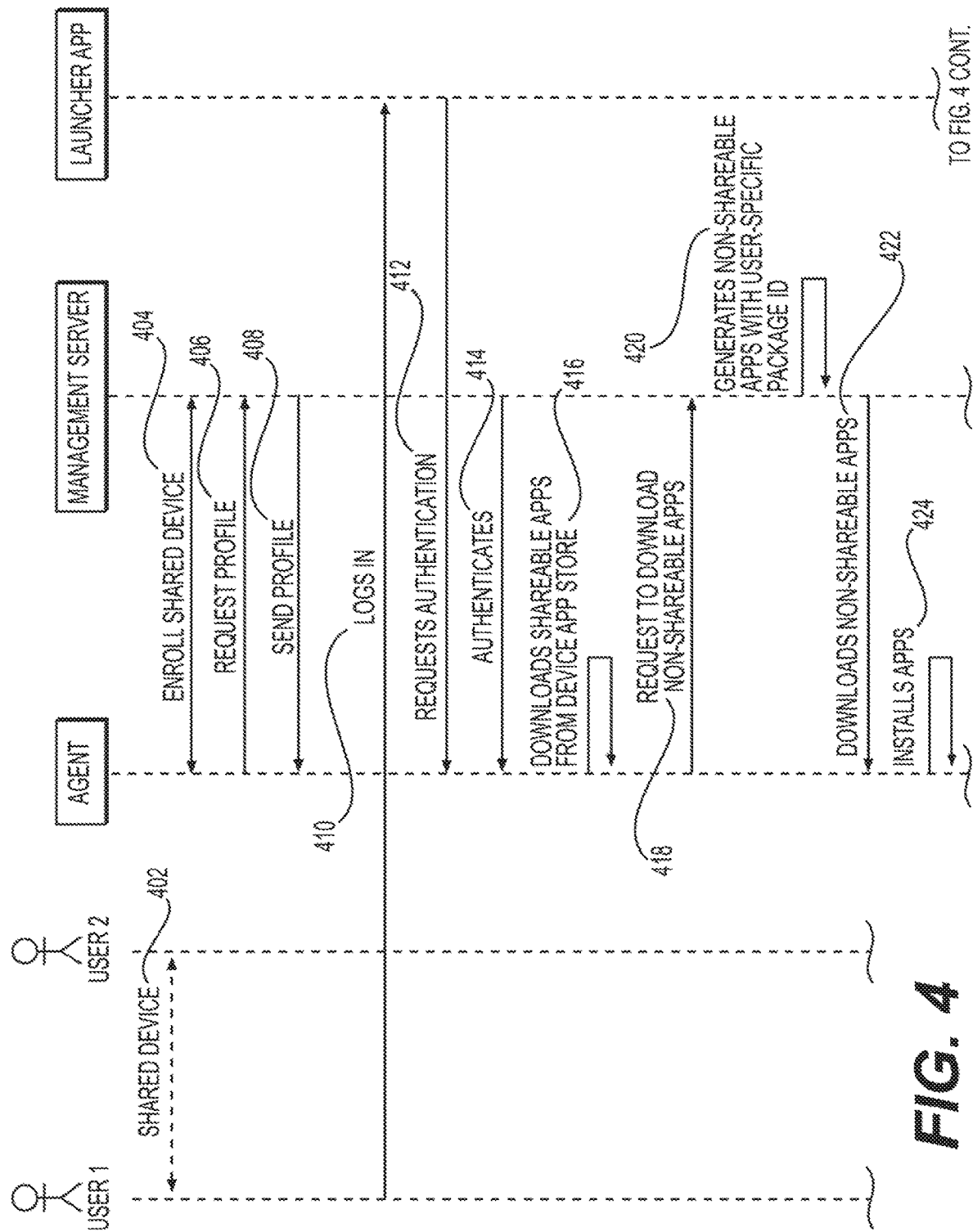
FIG. 4 is a sequence diagram of an exemplary method for providing user-specific applications on a shared user device.
Figure 4:
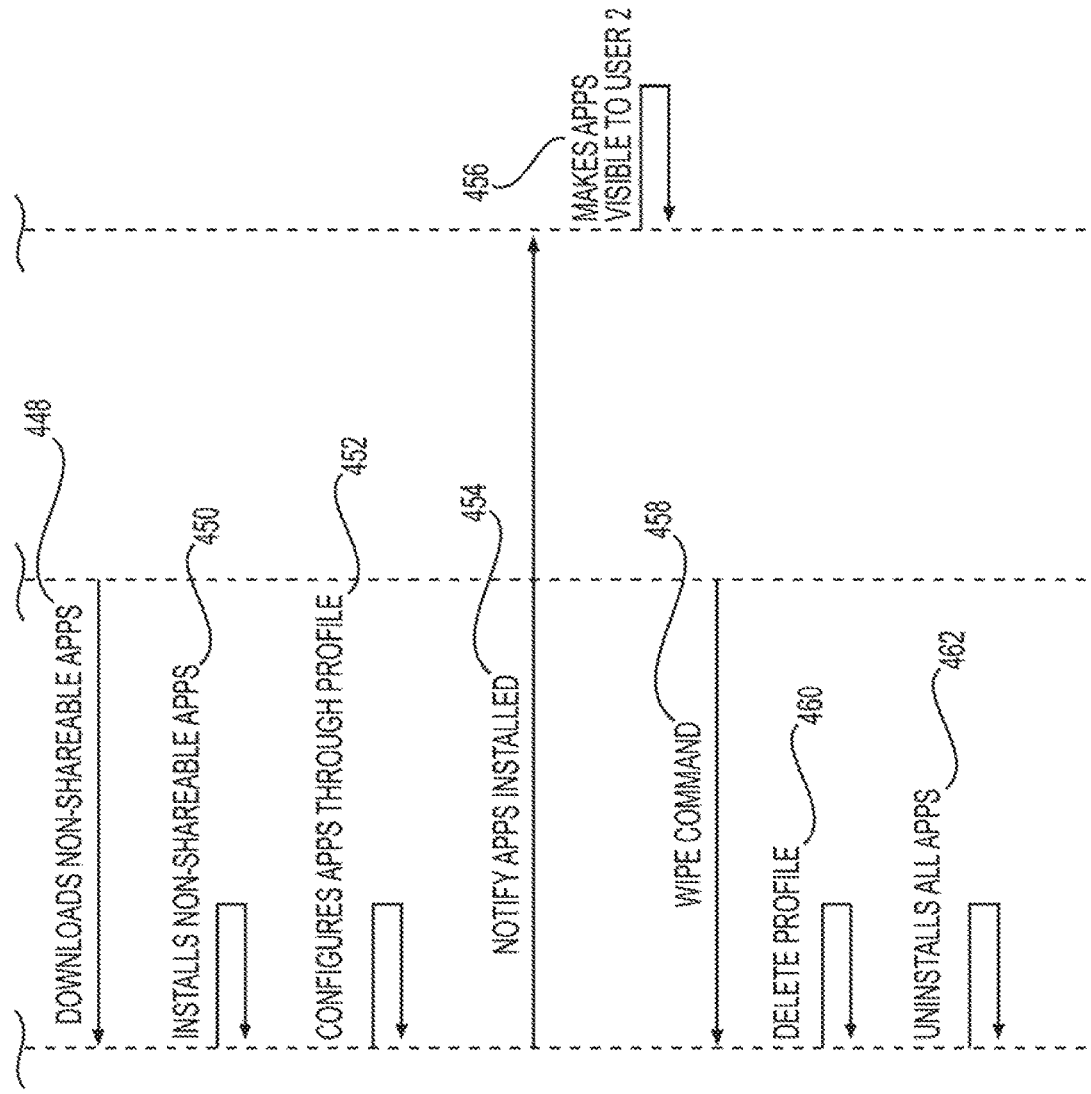
Figure 5:
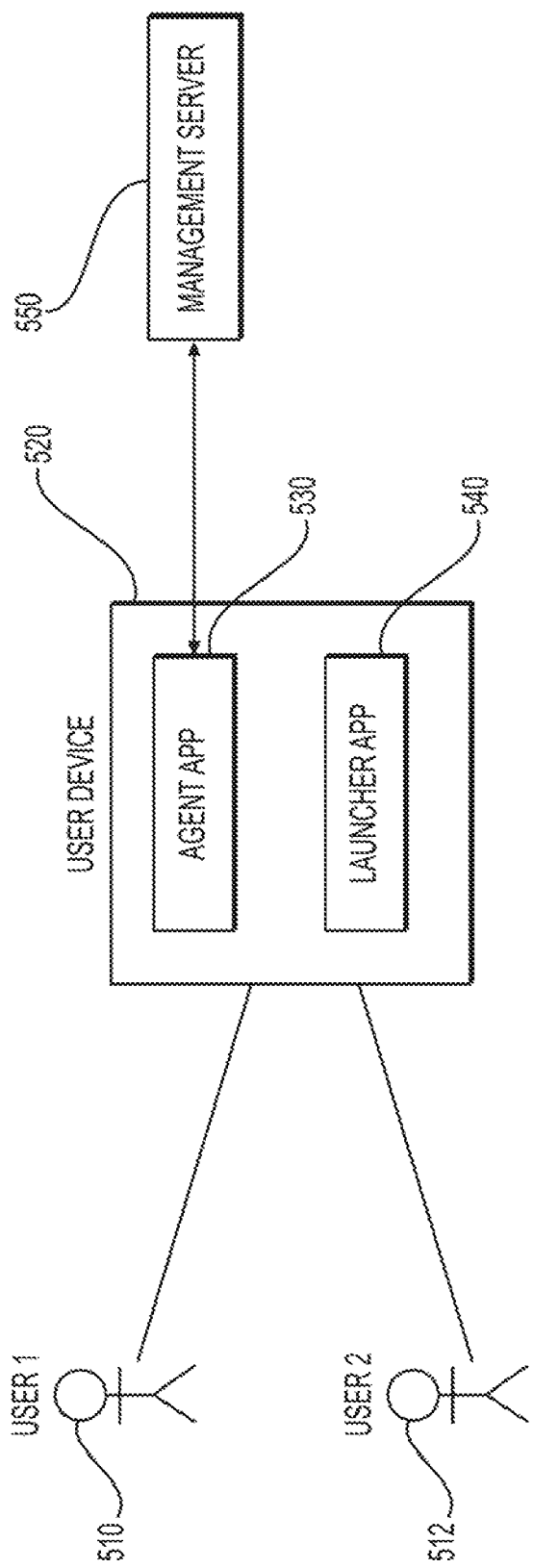
FIG. 5 is system diagram of an example system for providing user-specific applications on a shared user device.
Figure 6:
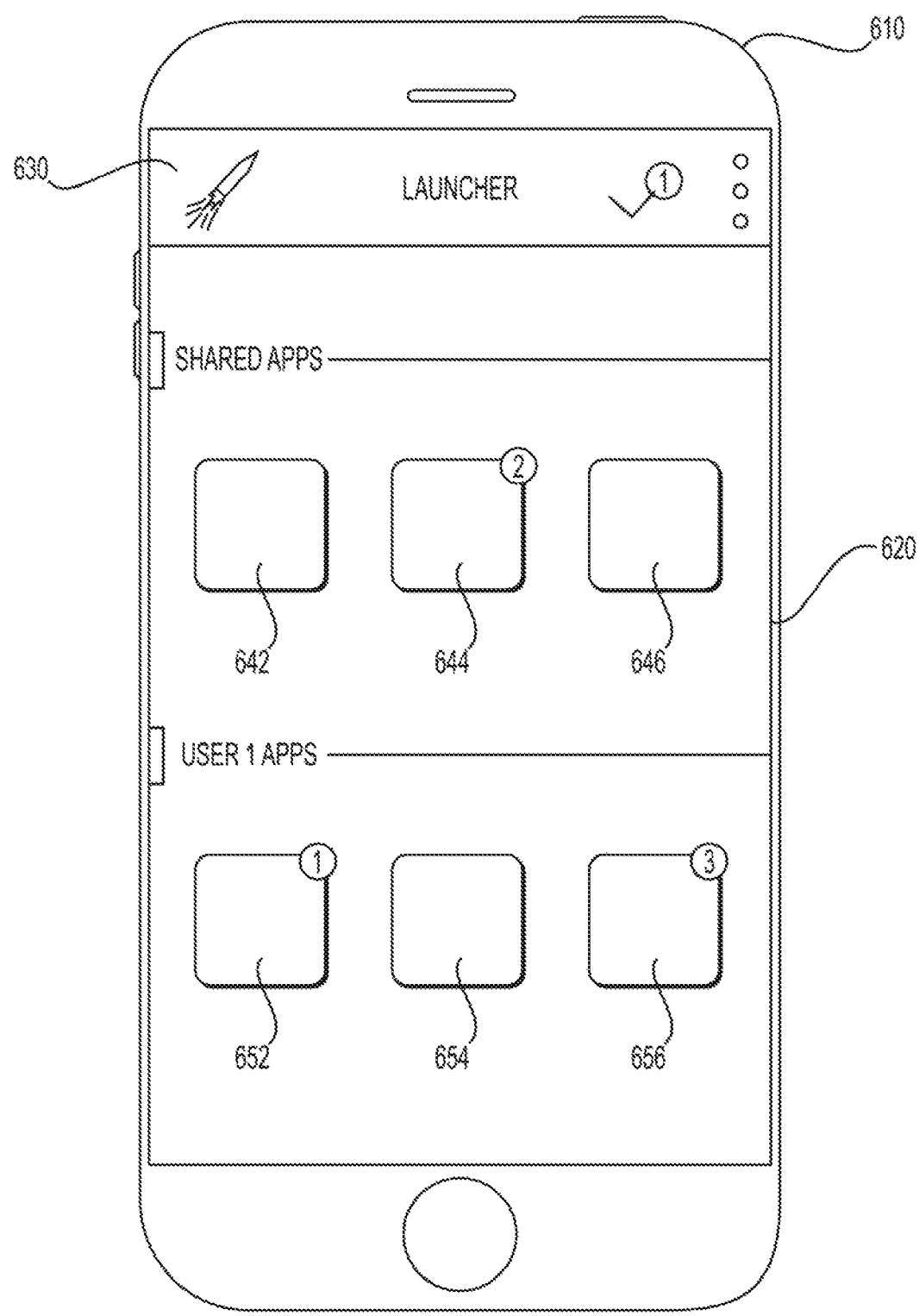
FIG. 6 is an illustration of an example user interface providing user-specific applications on a shared user device.

FIGS. 1-3 provide flowcharts of example methods for providing user-specific applications on a shared user device. FIG. 4 provides a more details sequence diagram of an example method for providing user-specific applications on a shared user device. FIG. 5 provides an illustration of an example system for providing user-specific applications on a shared user device. FIG. 6 provides an illustration of an example user interface providing user-specific applications on a shared user device.

Turning to the example method of FIG. 1, stage 110 can include receiving a first instance of an application having a Package ID that includes an identification of a first user. As explained above, an "instance" of an application can include a particular software package of an application, a particular installation of an application, or a particular virtualization of an application. The first instance of the application can be received at a user device, such as a phone, tablet, watch, or any other computing device that includes a processor and a memory store. The first instance of the application can be received from a remote server, such as a management server, as discussed with respect to FIG. 5.

The first instance of the application can include a Package ID that identifies the first instance of the application. The Package ID can also include an identification of the first user. The general format for a Package ID can be: applicationDefaultPackageID_username. In that example, the Package ID includes both the default Package ID for that application as well as the username associated with the first user. In an example where the username is "user1" and the application is VMWARE's BOXER, the Package ID can be: com.boxer.email_user1. These Package IDs are merely examples, and any Package ID can be used that includes some identification of the first user. The identification can be a username, User ID, email address, or any other form of identification that can be included in a Package ID.

In one example, the Package ID can be created by a management server that is part of the EMM system. The management server can append the User ID to a default package identifier that normally identifies the application. In one example, when the application is installed at the user device, separate registry keys can be stored for the customized Package ID. This can allow the installation of multiple copies of the same application. Otherwise, many operating systems will block the same application from being installed twice. For example, the operating system can recognize an existing registry key with a particular package identifier and prevent the duplicative installation.

A profile downloaded to the user device from the management server can specify which Package ID's correspond to the logged-in user. When a user logs in, an agent on the user device can retrieve a user profile from the management server. This profile can indicate which applications to display. The associated applications and data can be decrypted by a key specific to the logged-in user. The applications with Package IDs not among those assigned to the user can be encrypted based on a different key, preventing the logged-in user from finding and accessing those applications or data.

The profile can update based on changes at the management server. This can allow an administrator to change which applications are available for certain users, and have the user device update which applications are displayed accordingly.

Stage 120 can include, when the first user is logged in at the user device, displaying an icon associated with the first instance of the application based on the Package ID. The first user can be "logged in" through a variety of methods. In one example, logging in includes unlocking the user device. In another example, logging in includes providing authentication credentials at an application installed on the device, such as a launcher application. In yet another example, logging in includes pairing the user device with another computing device associated with the user, such as a watch, tablet, phone, or laptop. In another example, logging in includes bringing a device capable of near-field-communication into proximity of the user device. Regardless of the particular manner, logging in can provide the user device with sufficient information to determine that a particular user, such as the first user, is currently using the device.

When the first user is logged in, the user device can selectively display an icon associated with the first instance of the application, based on the Package ID. The user device can determine whether the Package ID of the first instance of the application includes a user identification that matches the identity of the first user logged in at the device. If the user identifications match, the user device can display a relevant icon. If the application is VMWARE's BOXER, for example, then the user device with display a BOXER icon.

If the user selects the icon displayed at stage 120, the user device can launch the particular instance of BOXER that is associated with that user. In an example where the device is shared by three users, each user might want to use BOXER to access corporate email. In that example, the user device displays a BOXER icon associated with the particular instance of BOXER matching the user that is logged in (based on the Package ID). When the first user is logged in, an icon associated with a first instance of BOXER can be displayed. The first instance can include settings and configurations specific to the first user, alleviating the need to set up the application each time the user logs back in to the device.

Stage 130 can include, when the first user is not logged in, hiding the icon associated with the first instance of the application. The first user can log out in various ways. In one example, the user can log out by locking the user device. In another example, the user can log out by terminating an application installed on the device, such as a launcher application. In another example, the user can select an option to log out of an application installed on the device, such as a launcher application. In another example, logging out includes unpairing the user device from another computing device used to log in. In another example, logging out includes removing a device capable near-field-communication from the proximity of the user device. In another example, logging out includes turning off, or powering down, the user device. The first user can also be logged out by another user logging in at the device.

When the user logs out, the user device can hide the icon associated with the first instance of the application. Hiding the icon can include turning off the display all together, or it can include omitting the icon from a user interface. For example, the user device can display icons associated with applications other than the first instance of the application. If another user logs into the device, the icon associated with the first instance of the application can continue to be hidden. Alternatively, the first user can continue to use the device even while not logged in. In that example, the first user would not be able to access the first instance of the application because the associated icon would be hidden at stage 130. A profile on the user device can specify which icons to show or hide for the user. In one example, multiple profiles can be downloaded in advance based on which users are allowed to access enterprise information on the shared device. In another example, the profile can be downloaded when the user logs in, and deleted when the user logs out.

FIG. 2 provides a flowchart of an example method for providing user-specific applications for a second user on a user device. The example of FIG. 2 can continue from the example of FIG. 1, using the same user device described above. Alternatively, the example of FIG. 2 can be executed on a different shared user device. Stage 210 of the method can include receiving a second instance of the application. The underlying application can be the same application underlying the first instance of the application described in FIG. 1. For example, the first and second instances can be different instances of VMWARE's BOXER application. The second instance of the application can have a Package ID that includes an identification of the second user. In an example where the second user's username is "user2" and the application is BOXER, the Package ID can be: com.boxer.email_user2. In one example, the first and second instances of the application differ only in the Package ID.

At stage 220, when the second user is logged in, the user device can display an icon associated with the second instance of the application. The icon can be displayed without displaying an icon associated with the first instance of the application, as the first instance is not associated with the second user. The distinction between icons associated with different instances of applications can be seamless and unnoticeable to the user. For example, the second user can be presented with an icon that looks identical to the icon associated with the first instance of the application. But if the second user selects the icon, the second instance of the application can be launched. The second user is not presented with an icon that would launch the first instance of the application, or any other instances of applications that are specific to another user.

FIGS. 1 and 2 describe examples where a user accesses a user-specific application. In the context of this disclosure, a user-specific application can be any application designated by an administrator as a user-specific or non-shareable application. For example, an administrator can designate an email application as user-specific, such that each user on a shared device can use an instance of the email application specific to that user.

An administrator might want to allow certain users to share applications in some circumstances. For example, VMWARE's CONTENT LOCKER application can be used to access enterprise information intended for certain groups of users. As an example, executives in an enterprise can have different levels of access relative to salespeople in the enterprise. If two members of the executive group share a device, each can be able to share the same instance of CONTENT LOCKER. On the other hand, if a salesperson shares a device with an executive, they can use different instances of the application.

An administrator can define groups of users within the enterprise as organizational groups. A single user can be a member of one or more organizational groups. In one example, the permissions for sharing applications are based on organizational groups. The organizational groups can be defined by an administrator at a management server using a console, for example. Information regarding a user's organizational group can be stored in a profile associated with each user. The profile can be stored at a remote server, such as a management server, on the users' devices, or both.

While applications can be defined as user-specific (including organizational-group-specific), some applications can be freely shared across users without security or efficiency concerns. For these shared applications, only a single instance needs to be installed on a shared user device. An example shared application is a weather application. Weather applications do not access confidential enterprise information and do not need to store user information in order to function properly. An administrator can therefore define shared applications, of which only one instance is downloaded and stored on a particular device. This can allow the device to operate more efficiently by retaining shared applications as different users operate the device, rather than wiping all applications and starting over for each user.

FIG. 3 provides a flowchart of an example method including a single instance of a shared application (a "shared instance") that is shared between multiple users. Stage 310 of the example method can include, when the first user is logged in to the user device, displaying a shared instance of a shared application. Logging in to the user device can include the multiple methods of logging in explained above. Displaying a shared instance of a shared application can include displaying an icon associated with the application or displaying the application itself, such as by launching the application. The shared instance of the shared application can retain its default Package ID that does not reference a particular user.

Stage 320 of the example method can include, when the second user is logged in to the user device, displaying the same shared instance of the shared application. The second user can log in using the various methods described above. The act of logging in can cause the first user to log out. In other examples, the first user can log out before the second user logs in. In either scenario, the same instance of the shared application can be displayed for the second user. This instance of the shared application can have the same, default Package ID as when the first user was logged in to the device. As a result, the device can retain only a single version of the shared application for use by multiple users.

FIG. 4 provides a sequence diagram of an exemplary method for providing user-specific applications on a shared user device. Stage 402 includes providing a shared user device that is shared by User 1 and User 2, as shown. The shared user device can include an agent application, such as a management agent. The agent, described in more detail with respect to FIG. 5, can be a portion of an operating system for the user device, or it can operate in the application layer of the user device. For example, the agent can be a dedicated application or other software installed on the user device that can monitor and manage data, software components, and hardware components associated with the user device. The agent can monitor and control functionality and other managed applications on the user device.

The shared user device can also include a launcher application, also described with respect to FIG. 5. The launcher application can be a portion of an operating system for the user device or it can operate in the application layer of the user device. The launcher application can provide an interface that replaces the standard device interface, allowing an administrator to custom tailor the interface for individual users or organizational groups. For example, the launcher application can cause the device to be locked into a single application with no access to other features or settings. As another example, the launcher application can access whitelisted applications available to the user while hiding other applications from the user. The whitelist can be maintained by an agent application, for example. An administrator can choose how to set up and administer the launcher application. An example of a launcher application is AIR-WATCH LAUNCHER. In some examples, the functionality of the launcher application is performed by the agent application. The launcher application can be part of the agent application, for example.

At stage 404 of the method, the shared device can be enrolled with a management server, including installation of the agent application if it is not already installed. Enrollment can also include exchanging information between the agent application and management server. Enrollment can allow the management server to provide instructions and requests to the agent application, which the agent application executes at the user device. Enrollment can also establish a trusted communication link between the management server and the user device. The agent application can provide information about the device to the management server, including the status of any hardware or software operating on the device.

At stage 406, the agent application can request a profile from the management server. The profile can be stored at the management server or at a remote storage location accessible to the management server. The profile can apply to a single user or to a group of users. For example, a profile can associate a user with various types of information, such as the user's username, credentials, organizational group(s), permissions, and policies. The profile can also apply to a particular group of users, establishing permissions and policies for an organizational group, for example. In some examples, the profile can apply to the device, establishing rules and policies to be carried out at the device by the agent application.

The profiles can include lists of applications designated as shareable or non-shareable. This determination can be made by an administrator at a console in communication with the management server. A shareable application can be any application for which the same instance of the application can be shared between users. An administrator can determine which applications fall into this category, for example by selecting applications that do not access secure enterprise information. Examples of shareable applications can include weather applications, stock-tracking applications, web browsers, and navigation applications, among others. An administrator can create a list including all shareable applications available to a device. In some examples, an application is considered shareable by default, unless otherwise listed as a non-shareable application.

Similarly, an administrator can create a list of all non-shareable applications (or applications can be deemed non-shareable by default, if not listed as a shareable application). The administrator can select applications to be non-shareable, for example by selecting applications that access secure enterprise information or require substantial setup time when switching between users. An example of a non-shareable application is an email application, such as VMWARE's BOXER application. An email application can potentially access enterprise information and can be time consuming upon initial setup, making it difficult for multiple users to share the same instance of the application.

Stage 406 can include requesting one or more profiles for each user or organizational group relevant to the device. For example, the stage can include requesting a profile for each of User 1 and User 2. At stage 408, the management server can provide the requested profiles to the agent application on the user device.

At stage 410, a user can log in at the device. In the example of FIG. 4, User 1 logs in to the launcher application. Logging in can include providing credentials, such as a username and password, or utilizing a single-sign-on ("SSO") service to provide the credentials at the launcher application. At stage 412, the launcher application can request authentication from the agent application. In some examples, the launcher application can request authentication directly from the management server. In an example where the launcher application request authentication from the agent application, the agent application can request authentication from the management server. In some examples, logging in at stage 410 can trigger the retrieval or one or more profiles at stage 406. In those examples, stage 410 can occur before stages 406 and 408.

The management server can authenticate the user by parsing the credentials to determine whether the user is authorized to use the shared device. The management server can also authenticate the status of the device, such as by confirming the current operating system on the device or the applications installed on the device. The management server can confirm authentication to the agent application at stage 414. If the launcher application requested authentication directly from the management server, then at stage 414 the management server can confirm authentication to the launcher application instead of, or in addition to, the agent application.

At stage 416, the agent application can download shareable applications from an application store, such as APPLE's APP STORE or GOOGLE PLAY STORE. The shareable applications can be identified in one or more profiles sent to the device at stage 408. In another example, the shareable applications are identified by a whitelist stored at the management server or on the device and accessible to the agent application.

At stage 418, the agent application can request to download non-shareable applications for User 1 from the management server. The request can be initiated by User 1 attempting to use an application or otherwise requesting access to the application. Non-shareable applications can be provided in a custom, user-specific format, and those particular versions are not available for download from an application store. Instead, the management server can generate one or more non-shareable applications at stage 420.

Because User 1 is logged in to the launcher application, the management server can generate instances of non-shareable applications that are specific to User 1. This can include modifying the default Package ID for the non-shareable application to include an identification of User 1. The modification can be performed using app wrapping—a process of applying a management layer to an application without requiring changes to the underlying application. In the example of FIG. 4, the Package ID of a non-shareable application can be changed to the following format: applicationDefaultPackageID_User1. Using the example of BOXER, the Package ID can be changed to: com.boxer.email_User1. Any Package ID can be used that includes an identification of User 1. The identification can take any form, such as a User ID or any string of characters associated with the user.

At stage 422, custom instances of applications generated at stage 420 can be downloaded to the device by the agent application. The agent application can install those instances of applications at stage 424 and configure them at stage 426. The configuration at stage 426 can be performed according to information in the profile downloaded at stage 408. For example, the profile can instruct that a non-shareable application should only be presented by the launcher application when a particular user—matching the user identification in the Package ID of that non-shareable application—is logged in to the launcher application.

At stage 428, the agent application notifies the launcher application regarding any shareable and non-shareable applications downloaded at stages 416 and 422, respectively. Stage 428 can include providing configuration details, profile details, or other instructions to the launcher application that inform the launcher application as to which applications to display under various circumstances. For example, the agent application can instruct the launcher application to make all shareable applications visible to User 1, but only make instances of non-shareable applications that include an identification of "User1" available to User 1.

At stage 430, the launcher application can make the appropriate applications visible to User 1. As explained, these applications can include shareable applications as well as any instances of non-shareable applications that include an identification of User 1.

At stage 432, User 1 logs out of the launcher application. As a result of User 1 logging out, at stage 434 the launcher application can hide instances of non-shareable applications that include an identification of User 1, as these instances are only intended to be available when User 1 is logged in. Stage 434 can include hiding only non-shareable applications, leaving the shareable applications available though the launcher application interface. This is described in more detail with respect to FIG. 6.

User 2 can log in to the device at stage 436 of FIG. 4. As shown in the diagram, this stage can include logging into the launcher application. At stage 438, the launcher application can request authentication from the agent application, which can communicate with the management server to authenticate User 2. Although not shown, these stages can include downloading an additional profile associated with User 2 that can list applications User 2 is authorized to access, including identifying applications available to User 2 either as shareable or non-shareable versions. In some examples, the profile downloaded at stage 408 can apply to User 2 as well, obviating the need to retrieve additional profiles. For example, the profile received at stage 408 can identify applications that are shareable and non-shareable across all users of the device.

At stage 442, one or more shareable applications can already be installed on the device and accessible to User 2. These applications, previously downloaded at stage 416, can remain accessible to User 2 because they were not hidden at stage 434. Rather, only the non-shareable applications can be hidden at stage 434. As a result, when User 2 logs into the launcher application in this example, the shareable applications can already be accessible.

At stage 444, the agent application can request to download non-shareable applications for User 2 from the management server. The request can be initiated by User 2 attempting to use an application or otherwise requesting access to the application. Non-shareable applications can be provided in a custom, user-specific format, and those particular versions are not available for download from an application store. Instead, the management server can generate one or more non-shareable applications at stage 446.

Generating instances of non-shareable applications for User 2 can include modifying the default Package ID for the non-shareable application to include an identification of User 2. In the example of FIG. 4, the Package ID of a non-shareable application can be changed to the following format: applicationDefaultPackageID_User2. Using the example of BOXER, the Package ID can be changed to: com.boxer.email_User2. Any Package ID can be used that includes an identification of User2. The identification can take any form, such as a User ID or any string of characters associated with the user.

At stage 448, custom instances of applications generated at stage 446 can be downloaded to the device by the agent application. The agent application can install those instances of applications at stage 450 and configure them at stage 452. The configuration at stage 452 can be performed according to information in the profile downloaded at stages 408 or 440. For example, the profile can instruct that a non-shareable application should only be presented by the launcher application when a user matching the user identification in the Package ID of that non-shareable application is logged in to the launcher application.

At stage 454, the agent application notifies the launcher application regarding any shareable and non-shareable applications downloaded at stages 416 and 448, respectively. Stage 454 can include providing configuration details, profile details, or other instructions to the launcher application that inform the launcher application as to which applications to display under various circumstances. For example, the agent application can instruct the launcher application to make all shareable applications visible to User 2, but only make instances of non-shareable applications that include an identification of "User2" available to User 2.

At stage 456, the launcher application can make the appropriate applications visible to User 2. As explained, these applications can include shareable applications as well as any instances of non-shareable applications that include an identification of User 2.

At stage 458, a wipe command is transmitted to the agent application from the management server. The wipe command can be initiated by an administrator or automatically by the management server. For example, an administrator can establish rules, policies, or restrictions that must be followed by a device enrolled into the management system. The administrator can also establish remedial actions to take place when a rule, policy, or restriction is violated. For example, a compliance rule can require that the agent application must remain installed on an enrolled device. If the agent application is uninstalled or disabled, the management server can cause the device to be wiped or otherwise restricted from enterprise information. Various types of compliance rules, policies, and restrictions can be implemented without limitation. The wipe command at stage 458 can be a remedial action carried out by the management server or a direct command from an administrator.

In response to receiving the wipe command, at stage 460 the agent application can delete any profiles, including a single user profile, downloaded at stage 408 or at other stages. The wipe command can be initiated by an administrator. For example, when an employee leaves the enterprise, an administrator can indicate the change in a console and the management server can issue a wipe command for that employee. Alternatively, the management server can send a wipe command for a particular user that has not logged into the user device for a threshold period of time, such as one month.

At stage 462, the agent application can uninstall all applications. In another example, at stage 462, the non-shareable applications for a specific profile are deleted based on a wipe command specific to a user identified in a wipe command.

FIG. 5 provides an illustration of an example system for carrying out the various methods described herein. The system can include User 1 510 and User 2 512, as described above. The system can also include a user device 520 such as a phone, tablet, watch, or any other computing device that includes a processor and a memory store. The user device 520 can also include a display, either built in to the device 520 or external to the device 520. It can also communicate via a network, such as the Internet, in wired or wireless fashion, using one or more components associated with the device 520.

The user device 520 can include an agent application 530. As described above, the agent application 530 can be a portion of an operating system for the user device 520, or it can operate in the application layer of the user device 520. For example, the agent application 530 can be a dedicated application or other software installed on the user device 520 that can monitor and manage data, software components, and hardware components associated with the user device 520. The agent application 530 can monitor and control functionality and other managed applications on the user device 520.

In one example, the management system requires enrolled devices to communicate with the management server 550 to report various information, including information sufficient to indicate whether the device 520 is complying with applicable compliance rules and policies. The agent application 530 can also determine whether a compliance rule is, or has been, satisfied by the user device 520. In some examples, the agent application 530 can parse a data object describing the state of the user device 520, including various settings of the user device as well as actions it has taken. Based on the data object, the agent application 530 can determine whether various compliance rules have been satisfied. In some examples, the agent application 530 can communicate with a management server 550 to determine whether the compliance rules are satisfied by the user device 520. For example, the agent application 530 can cause the data object to be transmitted to the management server 550 to facilitate that determination.

A compliance rule can set forth one or more conditions that must be satisfied for a user device 520 to be deemed compliant. If compliance is broken, the management server 550 can take steps to control access of the user device 520 to enterprise files and email. The determination of whether a user device 520 is compliant can be made by the management server 550, the user device 520, or a combination of both. For example, an agent application 530 on the user device 520 can generate a data object that describes the state of the user device 520, including any settings, parameters, applications, or other information regarding the state of the user device 520. The data object can be analyzed by the management server 550 or the user device 520 to determine whether the user device 520 is in compliance with compliance rules. In the case of the user device 520 analyzing compliance, the agent application 530 installed on the user device 520 can make the comparison between the data object and compliance rules.

In some examples, a compliance rule can specify one or more triggering conditions. If a triggering condition occurs, the system can react accordingly. For example, the management server 550 can automatically perform one or more remedial actions, such as restricting or wiping the user device 520. In another example, the management server can prompt an administrator to take one or more remedial actions. In some cases, remedial actions can be staged, such that the user of a user device is provided with a chance to remedy their noncompliance before being subjected to stricter remedial actions.

The user device 520 can also include a launcher application 540. The launcher application 540 can be a portion of an operating system for the user device 520 or it can operate in the application layer of the user device 520. The launcher application 540 can provide an interface that replaces the standard device interface, allowing an administrator to custom tailor the interface for individual users or organizational groups. For example, the launcher application 540 can cause the device 520 to be locked into a single application with no access to other features or settings. As another example, the launcher application 540 can provide a set of whitelisted applications available to a user while hiding other applications from the user. An administrator can choose how to set up and administer the launcher application 540. An example of a launcher application 540 is AIRWATCH LAUNCHER.

FIG. 6 provides an illustration of an example user device 610 and graphical user interface ("GUI") 620. The GUI 620 of FIG. 6 is displaying a user interface presented by a launcher application 540. The launcher application 540 can include a header section 630 that provides access to settings and other menu options. In a first portion of the GUI 620, labelled "Shared Apps," icons can be displayed corresponding to various shared applications. In the example of FIG. 6, icons 642, 644, and 646 each correspond to an application that is considered a shared application. Displaying these icons 642, 644, 646 can be considered displaying the respective applications, as that phrase is used throughout this disclosure.

Similarly, a second portion of the GUI 620, labelled "User 1 Apps," provides icons corresponding to various non-sharable application that are specific to User 1. Each of these icons 652, 654, 656 can correspond to a User-1-specific instance of an application that includes a modified Package ID including an identification of User 1. In this example, User 1 is logged in to the launcher application 540 and therefore is presented with icons specific to User 1.

If User 1 logged out of the launcher application 540, the icons 652, 654, 656 in the "User 1 Apps" section can be hidden or removed. Hiding or removing those icons 652, 654, 656 can also be described as hiding the applications, or the instances of applications, associated with those icons 652, 654, 656.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for providing user-specific applications on a shared user device, comprising:
   authenticating a first user to log in to the user device;
   receiving, at the user device, a first instance of an application having a Package ID that includes an identification of the first user;
   displaying, on a graphical user interface (GUI) of the user device that includes a plurality of icons associated with launching different applications, an icon associated with launching the first instance of the application at the user device, based on the Package ID; and
   when the first user is not logged in to the user device, hiding the icon associated with launching the first instance of the application.

2. The method of claim 1, further comprising:
   receiving, at the user device, a second instance of an application having a Package ID that includes an identification of a second user; and
   when the second user is logged in, displaying an icon associated with the second instance of the application without displaying the first instance of the application.

3. The method of claim 1, further comprising:
   when the first user is logged in at the user device, displaying a shared instance of a shared application; and
   when the second user is logged in at the user device, displaying the same shared instance of the shared application.

4. The method of claim 1, wherein hiding the first instance of the application comprises displaying a user interface that does not include an icon associated with the first instance of the application.

5. The method of claim 4, wherein hiding the first instance of the application further comprises storing the first instance of the application, and settings associated with the first instance of the application, on the user device.

6. The method of claim 1, further comprising deleting the first instance of the application from the user device if it is not executed within a threshold time period.

7. The method of claim 1, wherein an administrator selects, at a console associated with a management server, whether a particular application can be shared by the first and second users, or whether separate instances of that application should be generated for the first and second user, respectively.

8. A non-transitory, computer-readable medium comprising instructions that, when executed by a processor of a computing device, perform stages for providing user-specific applications on a shared user device, the stages comprising:
   authenticating a first user to log in to the user device;
   receiving, at the user device, a first instance of an application having a Package ID that includes an identification of the first user;
   displaying, on a graphical user interface (GUI) of the user device that includes a plurality of icons associated with launching different applications, an icon associated with launching the first instance of the application at the user device, based on the Package ID; and
   when the first user is not logged in at the user device, hiding the icon associated with launching the first instance of the application.

9. The non-transitory, computer-readable medium of claim 8, the stages further comprising:
   receiving, at the user device, a second instance of an application having a Package ID that includes an identification of a second user; and
   when the second user is logged in, displaying an icon associated with the second instance of the application without displaying the first instance of the application.

10. The non-transitory, computer-readable medium of claim 8, the stages further comprising:
    when the first user is logged in at the user device, displaying a shared instance of a shared application; and
    when the second user is logged in at the user device, displaying the same shared instance of the shared application.

11. The non-transitory, computer-readable medium of claim 8, wherein hiding the first instance of the application comprises displaying a user interface that does not include an icon associated with the first instance of the application.

12. The non-transitory, computer-readable medium of claim 11, wherein hiding the first instance of the application further comprises storing the first instance of the application, and settings associated with the first instance of the application, on the user device.

13. The non-transitory, computer-readable medium of claim 8, the stages further comprising deleting the first instance of the application from the user device if it is not executed within a threshold time period.

14. The non-transitory, computer-readable medium of claim 8, wherein an administrator selects, at a console associated with a management server, whether a particular application can be shared by the first and second users, or whether separate instances of that application should be generated for the first and second user, respectively.

15. A system for providing user-specific applications on a shared user device, comprising:
- a memory storage including a non-transitory, computer-readable medium comprising instructions; and
- a computing device including a processor that executes the instructions to carry out stages comprising:
   - authenticating a first user to log in to the user device;
   - receiving, at the user device, a first instance of an application having a Package ID that includes an identification of the first user;
   - displaying, on a graphical user interface (GUI) of the user device that includes a plurality of icons associated with launching different applications, an icon associated with launching the first instance of the application at the user device, based on the Package ID; and
   - when the first user is not logged in at the user device, hiding the icon associated with launching the first instance of the application.

16. The system of claim 15, the stages further comprising:
- receiving, at the user device, a second instance of an application having a Package ID that includes an identification of a second user; and
- when the second user is logged in, displaying an icon associated with the second instance of the application without displaying the first instance of the application.

17. The system of claim 15, the stages further comprising:
- when the first user is logged in at the user device, displaying a shared instance of a shared application; and
- when the second user is logged in at the user device, displaying the same shared instance of the shared application.

18. The system of claim 15, wherein hiding the first instance of the application comprises displaying a user interface that does not include an icon associated with the first instance of the application.

19. The system of claim 18, wherein hiding the first instance of the application further comprises storing the first instance of the application, and settings associated with the first instance of the application, on the user device.

20. The system of claim 15, the stages further comprising deleting the first instance of the application from the user device if it is not executed within a threshold time period.

* * * * *